United States Patent
Grassl et al.

(10) Patent No.: US 7,039,815 B1
(45) Date of Patent: May 2, 2006

(54) METHOD FOR PROTECTING A DATA MEMORY

(75) Inventors: Thomas Grassl, Freising (DE); Arvid Wiren, München (DE); Walter Straub, Oberhaching (DE)

(73) Assignee: Giesecke & Devrient GmbH, Munich (DE)

(*) Notice: Subject to any disclaimer, the term of this patent is extended or adjusted under 35 U.S.C. 154(b) by 1032 days.

(21) Appl. No.: 09/671,731

(22) Filed: Sep. 29, 2000

(30) Foreign Application Priority Data

Oct. 1, 1999 (DE) ................................ 199 47 574

(51) Int. Cl.
*G06F 11/30* (2006.01)
*G06F 12/14* (2006.01)
*H04L 9/32* (2006.01)
*H04L 9/00* (2006.01)

(52) U.S. Cl. ....................................... 713/194; 713/164
(58) Field of Classification Search ............... 713/194, 713/200, 164
See application file for complete search history.

(56) References Cited

U.S. PATENT DOCUMENTS 4,857,912 A * 8/1989 Everett et al. ............... 340/508
6,308,272 B1 * 10/2001 Pearce .......................... 713/200

FOREIGN PATENT DOCUMENTS

GB      227107 A  *  5/1979

* cited by examiner

*Primary Examiner*—Gilberto Barron, Jr.
*Assistant Examiner*—G. Gurshman
(74) *Attorney, Agent, or Firm*—Bacon & Thomas, PLLC

(57) ABSTRACT

A method for protecting a security data memory is described wherein external action on a component containing the security data memory is detected by sensors. Overshooting of a threshold on one of the sensors causes an attack to be signaled by reason of which the content of the security data memory is at least partly erased. The status of the sensors is permanently monitored and the status data of the sensors recorded.

14 Claims, 2 Drawing Sheets

METHOD FOR PROTECTING A DATA MEMORY

BACKGROUND OF THE INVENTION

1. Field of the Invention

The present invention relates to a method for protecting a security data memory and a security processor having such a security data memory. The terms "security data memory" and "secured data storage" as used herein refer to any data memory or protected data storage containing security-relevant data which must be protected from unauthorized access.

2. Description of Related Art

Such security processors having security data memories are found in particular in smart cards and smart card terminals used to make a data link with a smart card. Since the security-relevant data are stored on the smart cards in coded form, the security processor must be in possession of the right keys to be able to process the smart card data. Said keys are stored in a security data memory. In order to prevent unauthorized persons from acquiring said key data and committing abuse with them, special measures are necessary.

The applicant's EFTPOS terminal is already known from practice. With this terminal the total security module with the security processor including display, keyboard and measuring heads is cast as one unit. A light sensor is located within the casting compound. As soon as said light sensor detects incidence of light, the security processor automatically erases the security-relevant data stored in the security data memory. Unauthorized access from outside would make the terminal inoperable, but a readout of the security-relevant data would no longer be possible.

EP 0 408 456 B2 describes a smart card whose microcircuit is protected from access by a plurality of sensors having a so-called state of prestress. Said sensors react to mechanical deformations. A plurality of sensors are distributed within the smart card in order to monitor the total smart card for attacks.

Said known security measures are reliable, but it is hitherto not possible to obtain information on how an attack was performed after a sensor responds, i.e. after an attack has occurred.

SUMMARY OF THE INVENTION

The objective of the present invention is provide a method for protecting a security data memory or a security processor having a security data memory which permits information to be gained on the nature and place of an an attack after one has occurred.

This problem is solved by a method according to claim 1 and by a security processor according to claim 10.

The permanent monitoring of the sensors, with the status data of the sensors constantly being stored, permits a log to be recorded indicating after an attack how the statuses of the individual sensors changed before the signaled attack.

The sensors can be any sensors which register different parameters such as temperature, pressure, light, radioactivity, x-rays, electron beams or the like at a great variety of places. This log permits information to be gained on the manner and the spatial area in which an attack was performed. Said data can firstly help to clarify the cause of the attack. Secondly, they can be useful in developing security technology.

The status data of the sensors are preferably stored cyclically in an overwritable memory by the data recording device, that is, only a certain number of past data records is stored in each case.

In principle the status data can be stored directly in a nonvolatile memory. The status data can also fundamentally be stored in a volatile memory whose permanent power supply is secured in every situation.

Preferably, the cyclic storage of the status data is first effected in a volatile temporary memory and the data are then transferred from the temporary memory to a nonvolatile final memory when an attack is signaled. Additionally, the status data of the sensors, or at least of the one sensor signaling the attack, are advantageously stored directly in the final memory when an attack is signaled.

In an especially time-economic embodiment with a low storage requirement at the same time, the status data of the sensors are passed on for permanent logging to an analog-to-digital converter which digitally codes the analog status data for storage in the volatile temporary memory. Only when an attack is signaled are the status data of the sensors, or the sensor which signaled the attack, stored directly in the final memory without previously running through the analog-to-digital converter and temporary memory.

Since one must expect an attack to be performed only after an interruption in the supply voltage, the security processor is provided with a battery buffer. A battery of course also includes an rechargeable accumulator in this context. This battery maintains the power supply to the sensors or the security data memory or the other components required for carrying out the method, for example the sensor evaluation device and data recording device, at least until the security-relevant data in the security memory are erased and the recording of the sensor data or transfer of the sensor data from the temporary memory to the final memory is concluded.

In order to ensure that at least the most important and most critical functions are performed even when the intended method cannot be performed completely due to the lack of supply voltage and deficient battery voltage, the following order is observed after an attack has occurred.

First, the security-relevant data in the security memory are erased. In a second step the current status data, at least of the sensor which signaled the attack, are then stored directly in the final memory. Subsequently the status data contained in the temporary memory are transferred to the final memory. When the status data are transferred from the temporary memory to the final memory a backward chronological order is observed, i.e. the most recent status data are transferred to the final memory first and the oldest status data at the end so that the log is as up-to-date as possible.

As described above, such security processors are used mainly within smart card terminals. However, the invention is obviously not restricted to this area of application. The inventive method or a corresponding security processor can be used wherever security-relevant data are to be protected from unauthorized access.

BRIEF DESCRIPTION OF THE DRAWINGS

The invention will be explained in more detail in the following by an example with reference to the enclosed drawings. The features shown therein may be essential to the invention not only in the stated combinations but also singly or in other combinations.

DETAILED DESCRIPTION OF THE PREFERRED EMBODIMENTS

Figure 1:
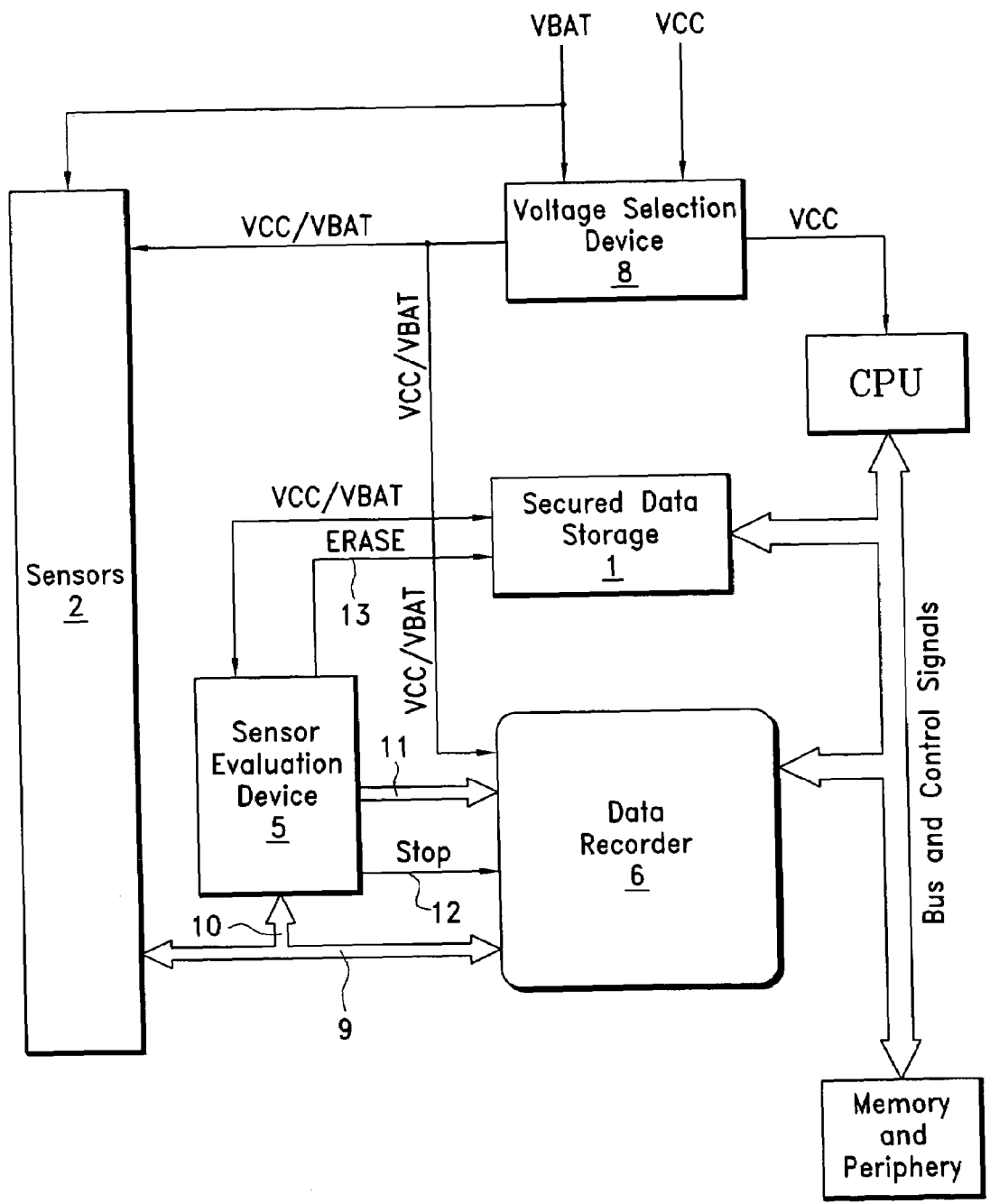
FIG. 1 shows a schematic block diagram of the functional arrangement of the sensor evaluation device and data recording device within the security processor.

The inventive security processor shown in the figures has a plurality of security sensors 2. Various sensors 2 are shown in FIG. 1 as a common block. They may involve a great variety of sensor types, for example light sensors, thermal sensors or sensors reacting to mechanical deformations or vibrations.

The signals of sensors 2 are passed on unchanged, that is, in analog form, via lines 9 to data recording device 6, on the one hand, and via branch 10 to sensor evaluation device 5, on the other hand.

Data recording device or circuit 6 has, at one input to which the analog sensor signals are transmitted via line 9, analog-to-digital converter 7 for digitizing the sensor signals. Said digital sensor signals are then passed on to rewritable, volatile temporary memory 3 and stored there cyclically. That is, the first sensor data record is stored first, then the second sensor data record, etc., until temporary memory 3 is completely occupied with n sensor data records. The n+1 data record that is the oldest data record, i.e., sensor data record "1", is then overwritten. In this way the last n data records are always stored so that a log for a certain, past time period is available at every point in time.

At the same time the sensor signals are evaluated within sensor evaluation device or circuit 5 as to whether one of the sensor signals undershoots or overshoots a given threshold. The thresholds can be freely adjusted for individual sensors 2 in order to vary the sensitivity of the total security circuit.

Figure 2:
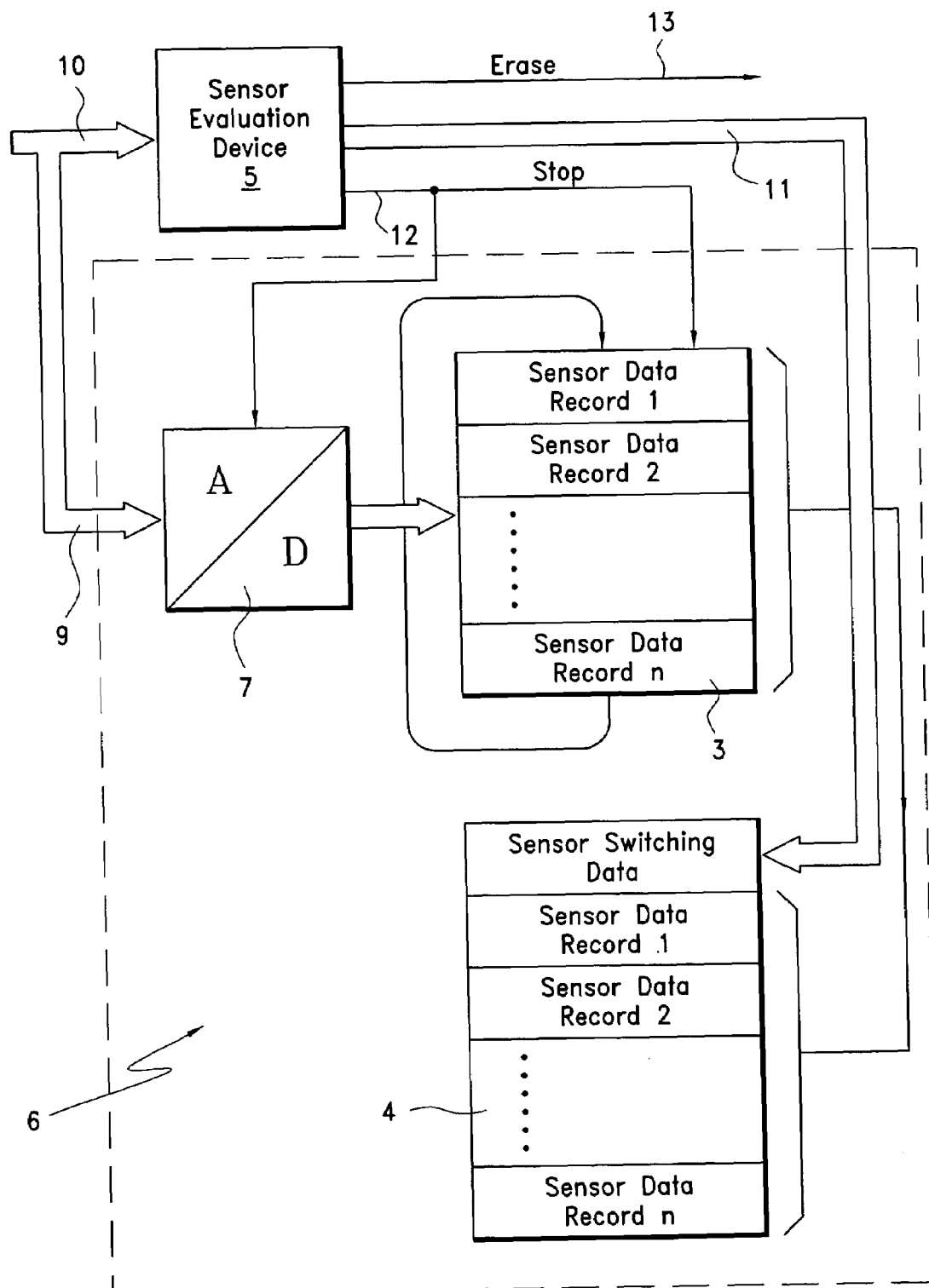
FIG. 2 shows a schematic block diagram of the sensor evaluation device and data recording device.

If the overshoot or undershoot of a threshold is signaled this is regarded as an attack on the security processor. In this case sensor evaluation device 5 actively erases the relevant area in secured data storage 1 via reset line 13. At the same time a stop command is given to analog-to-digital converter 7 and temporary memory 3 via line 12 for stopping further digitization of the sensor signals and their storage in the temporary memory. Furthermore, the sensor signals are passed on via line 11 to data recording device 6 and written there directly to nonvolatile final memory 4 as sensor switching data (FIG. 2).

Subsequently the content of temporary memory 3 is mirrored, i.e. copied, automatically to nonvolatile final memory 4 within data recording device 6. This copy process is performed backwards in time in terms of the age of the data records. That is, the last byte is first recorded from all sensors 2, then the next-to-last byte, etc. The data of the sensor which signaled the attack are transferred first.

When the security processor is started up again after an attack, the CPU of the security processor can then read out final memory 4 via the internal bus and thus filter out the desired information.

Before the next usage, i.e. the refocusing of sensors 2, final memory 4 is erased again after readout so that it only contains the current sensor statuses in the case of a new attack.

In order to ensure the run of the security functions in the case of an attack with the supply voltage interrupted, the security processor is supplied with battery voltage VBA T besides supply voltage VCC. For this purpose, both supply voltage VCC and battery voltage VBAT are applied to voltage selection device or circuit 8 of the security processor. Voltage selection device 8 constantly monitors supply voltage VCC and ensures that if supply voltage VCC drops below a minimal value the decisive components are automatically supplied further with battery voltage VBAT. Sensors 2 can in part also be supplied directly with battery voltage VBAT permanently.

The abovementioned special order of the individual functional steps ensures that even if battery voltage VBAT fails, i.e. if battery voltage VBAT drops below a minimal value, most probably at least the erasure of the security-relevant data is guaranteed and furthermore the information is retained preferably in accordance with its importance for later evaluation.

The invention claimed is:

1. A method for protecting a secured data storage (1), by using sensors (2) to detect an external action on a component, said method comprising the steps of:
   determining that an attack has occurred based on undershooting or overshooting of a threshold on one of the sensors (2);
   at least partially erasing a content of the secured data storage (1) upon determining that an attack has occurred;
   permanently monitoring a status of the sensors (2), said component contains the secured data storage(1) and an overwritable memory; and
   recording status data of the sensors (2) by storing the status data cyclically in said overwritable memory (3).

2. A method according to claim 1, wherein the step of recording said status data comprises the step of storing the status data of the sensors (2) in a nonvolatile memory (4).

3. A method according to claim 1, wherein the step of recording said status data comprises the step of storing the status data of the sensors (2) in a volatile temporary memory (3) and when an attack is signaled, transferring the status data contained in the temporary memory (3) to a nonvolatile final memory (4).

4. A method according to claim 3, wherein when an attack is signaled at least the status data of the sensor signaling the attack are stored directly in the final memory (4).

5. A method according to claim 4, wherein the status data are stored in the temporary memory (3) in digitally coded form, and direct storage of the status data in the final memory (4) is done in analog form when an attack is signaled.

6. A method according to claim 1, further comprising the step of, if the supply voltage (VCC) fails, maintaining a power supply to the sensors (2) and/or the secured data storage (1), and/or further components (3, 4, 5, 6, 7) required for carrying out the method with a battery for a certain time period.

7. A method according to claim 4, wherein after an attack is signaled the content of the secured data storage (1) is first erased, then the current status data at least of the sensor signaling the attack are stored in the final memory (4), and subsequently the status data contained in the temporary memory (3) are transferred to the final memory (4).

8. A method according to claim 1, wherein the step of recording said status data comprises the step of transferring the status data stored in the temporary memory (3) to the final memory (4) in reverse chronological order in terms of their age, the status data of the sensor signaling the attack being transferred first and then the status data of the other sensors.

9. A security processor, comprising:
a secured data storage (1);
an overwritable memory;
sensors (2) for detecting external action on the security processor and/or the secured data storage (1);
a sensor evaluation device (5) which at least partly erases a content of the secured data storage (1) when a threshold is overshot on one of the sensors (2); and
a data recording device (6) which permanently records the status data of the sensors (2) in said overwritable memory (3) in which the status data of the sensors (2) is cyclically stored by the data recording device (6).

10. A security processor according to claim 9, wherein said memory includes a volatile temporary memory (3) in which the status data of the sensors (2) are stored permanently, and a nonvolatile final memory (4) to which the status data contained in the temporary memory (3) are transferred when an attack is signaled.

11. A security processor according to claim 9, wherein said memory includes a volatile temporary memory (3) in which the status data of the sensors (2) are stored permanently, and a nonvolatile final memory (4) to which the status data contained in the temporary memory (3) are transferred when an attack is signaled.

12. A security processor according to claim 9, further comprising an analog-to-digital converter (7) which digitally codes the analog status data before storage.

13. A security processor according to claim 11, wherein the sensor evaluation device (5) is connected with the final memory (4) and when an attack is signaled at least the status data of the sensor signaling the attack are stored directly in the final memory (4).

14. A security processor according to claim 1, further comprising a battery which maintains a power supply to the sensors (2), and/or secured data storage (1), and/or sensor evaluation device (5), and/or data recording device (6), and/or data recording device (6) for the status data of the sensors for a certain time period if the supply voltage (VCC) fails.

* * * * *